US012079641B2

(12) United States Patent
Tang et al.

(10) Patent No.: US 12,079,641 B2
(45) Date of Patent: Sep. 3, 2024

(54) MACHINE LEARNING BASED POWER AND PERFORMANCE OPTIMIZATION SYSTEM AND METHOD FOR GRAPHICS PROCESSING UNITS

(71) Applicant: MOORE THREADS TECHNOLOGY CO., LTD., Beijing (CN)

(72) Inventors: Zhiwei Tang, San Diego, CA (US); Jing Wu, San Diego, CA (US); Suolong Dong, San Diego, CA (US)

(73) Assignee: Moore Threads Technology Co., Ltd., Beijing (CN)

( * ) Notice: Subject to any disclaimer, the term of this patent is extended or adjusted under 35 U.S.C. 154(b) by 0 days.

(21) Appl. No.: 17/879,986

(22) Filed: Aug. 3, 2022

(65) Prior Publication Data

US 2024/0045699 A1 Feb. 8, 2024

(51) Int. Cl.
*G06F 9/44* (2018.01)
*G06F 9/448* (2018.01)
*G06N 3/08* (2023.01)
*G06T 1/20* (2006.01)
*G06T 15/00* (2011.01)

(52) U.S. Cl.
CPC ............. *G06F 9/4482* (2018.02); *G06N 3/08* (2013.01); *G06T 1/20* (2013.01); *G06T 15/005* (2013.01)

(58) Field of Classification Search
CPC ........... G06F 9/4482; G06N 3/08; G06T 1/20; G06T 15/005
See application file for complete search history.

(56) References Cited

U.S. PATENT DOCUMENTS

| 8,689,220 B2* | 4/2014 | Prabhakar | ............. G06F 9/4893 716/109 |
| 11,640,194 B2* | 5/2023 | Masters | .................. G06F 1/324 713/310 |
| 2008/0201591 A1* | 8/2008 | Hu | ......................... G06F 1/3203 713/323 |

(Continued)

FOREIGN PATENT DOCUMENTS

| CN | 110209501 A | 9/2019 |
| CN | 111427750 A | 7/2020 |

(Continued)

OTHER PUBLICATIONS

GPU Power Prediction via Ensemble Machine Learning for DVFS Space Exploration (Year: 2018).*

(Continued)

*Primary Examiner* — Zahid Choudhury
(74) *Attorney, Agent, or Firm* — Sheppard Mullin Richter & Hampton LLP (57) ABSTRACT

Systems and methods to dynamically adjust operating conditions of a graphics processing unit (GPU) are disclosed. A machine learning model is trained to determine operating voltages and frequencies to be provided to a GPU core of the GPU to execute a workload comprising a plurality of commands. The trained machine learning model is deployed to firmware of the GPU. A command in the workload to be executed by the GPU core is received. The trained machine learning model determines operating voltage and frequency for the GPU core to execute the command.

20 Claims, 6 Drawing Sheets

(56) References Cited

U.S. PATENT DOCUMENTS

| | | | | |
|---|---|---|---|---|
| 2011/0134111 | A1* | 6/2011 | Stone | G06F 9/45541 |
| | | | | 345/419 |
| 2012/0110099 | A1* | 5/2012 | Fujihara | H04L 12/1818 |
| | | | | 709/206 |
| 2018/0293776 | A1* | 10/2018 | Ray | G06F 12/0842 |
| 2019/0250691 | A1* | 8/2019 | Lee | G06N 3/08 |
| 2022/0164423 | A1* | 5/2022 | Callegari | H04W 12/06 |
| 2023/0079229 | A1* | 3/2023 | Lovell | G06N 3/065 |
| | | | | 706/15 |
| 2023/0205293 | A1* | 6/2023 | Zhou | G06N 3/04 |
| | | | | 713/340 |

FOREIGN PATENT DOCUMENTS

| | | |
|---|---|---|
| CN | 112363842 A | 2/2021 |
| KR | 2021-0078260 A | 6/2021 |

OTHER PUBLICATIONS

PCT International Search Report and the Written Opinion mailed Nov. 3, 2023, issued in related International Application No. PCT/CN2023/110957 (6 pages).

* cited by examiner

Computing Component 400

Hardware Processor(s) 402

Machine-Readable Storage Media 404

Train a machine learning module to predict operating voltages and frequencies to be provided to a GPU core of a GPU to execute a workload comprising a plurality of commands
406

Deploy the trained machine learning model to firmware of the GPU
408

Receive a command in the workload to be executed by the GPU core
410

Determine, by the trained machine learning model, operating voltage and frequency for the GPU core to execute the command
412

FIGURE 4

MACHINE LEARNING BASED POWER AND PERFORMANCE OPTIMIZATION SYSTEM AND METHOD FOR GRAPHICS PROCESSING UNITS

TECHNICAL FIELD

The present inventions relate to processor power management. Particularly, the present inventions relate to optimizing power delivered to graphics processing units (GPUs).

BACKGROUND

Current implementations of power optimization in integrated circuits are generally based on dynamic voltage frequency scaling (DVFS). In DVFS, a processor, such as a central processing unit (CPU) or a graphics processing unit (GPU), adjusts its operating voltages and frequencies according to past workloads to meet the needs of a current or subsequent workload. This type of DVFS scheme is generally not suited for GPU workloads that vary instantaneously, as so-adjusted voltages and frequencies would not match requirements of every workload and can result in energy and performance losses.

SUMMARY

Described herein are systems and methods to dynamically adjust operating conditions of a graphics processing unit (GPU). A machine learning model can be trained to determine operating voltages and frequencies to be provided to a GPU core of the GPU to execute a workload comprising a plurality of commands. The trained machine learning model can be deployed to firmware of the GPU. A command in the workload to be executed by the GPU core can be received. The trained machine learning model can determine operating voltage and frequency for the GPU core to execute the command.

In some embodiments, the determined operating voltage and frequency to the GPU core can be provided before the GPU core executes the command.

In some embodiments, the machine learning model can comprise a voltage-frequency inference model trained to determine operating voltages and frequencies of the GPU core in executing commands.

In some embodiments, the machine learning model can further comprise a draw performance inference model trained to determine performance data of the GPU core in executing the commands.

In some embodiments, the machine learning model further comprises a power inference model trained to determine power consumptions of the GPU core in executing the commands.

In some embodiments, the operating voltage and frequency for the GPU core can be adjusted if a determined power consumption exceeds a threshold.

In some embodiments, performance data of the GPU core in executing the command can be determined based on the command. A power consumption of the GPU core in executing the command can be determined based on the command. The optimal operating voltage and frequency for the GPU core to execute the command can be determined based on the command, the determined performance data, and the determined power consumption.

In some embodiments, the machine learning model can be trained with a first dataset generated from a GPU simulation model. The first dataset can comprise data associated with simulated commands for a workload, simulated operating voltages, simulated operating frequencies, simulated power consumption and simulated performance data of the GPU core in executing the simulated commands.

In some embodiments, the machine learning model can be trained with a second dataset generated from a GPU simulation model. The second dataset can comprise data associated with simulated commands for a workload, simulated operating voltages, simulated operating frequencies, simulated power consumption and simulated performance data of the GPU core in executing the simulated commands.

In some embodiments, a second command to be executed by the GPU core can be received. The trained machine learning model can determine, based on the second command, second operating voltage and frequency for the GPU core to execute the second command.

In some embodiments, the commands of the workload can include at least a draw command for rendering three-dimensional graphics.

In some embodiments, the trained machine learning model is not based on a feedback mechanism in which the trained machine learning model provides operating frequency and voltage to the GPU core to execute a current workload based on operating frequency and voltage of the GPU core in executing a previous workload.

These and other features of the apparatuses, systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Current implementations of DVFS, which attempt to adjust GPU operating voltage and frequency to meet the needs of a current or subsequent workload based on a previous workload are not ideal for power optimization of modern GPUs.

Described herein are inventions that address the problems described above. In various embodiments, a GPU machine learning-based power performance optimization system can be implemented to optimize GPU performance while conserving power. By using power and performance data of graphics processing units (GPUs) collected from use cases simulated using a GPU simulation model, a machine learning model associated with the GPU machine learning-based power performance optimization system can be trained to develop various inference models to determine optimal voltages and frequencies of a GPU to execute commands of a workload. In general, a workload can be defined as one or more commands instructed to a GPU to render an image frame. The inference models can determine the optimal voltages and frequencies based on commands in workloads to be executed by the GPU on a per-command basis. Once trained, the inference models can be deployed (i.e., loaded) to power management firmware of the GPU to intervene commands. Based on each upcoming command to be executed by the GPU, the inference models in the firmware can determine and provide optimal voltage and frequency to the GPU to execute each upcoming command of a workload on a per-command basis. These and other features of the inventions are described in further detail herein. According to various embodiments of the present disclosure, optimal voltage and frequency refer to those capable of achieving peak performance under a given power consumption, achieving given performance under a minimum power consumption, or achieving optimal power efficiency overall.

Figure 1:
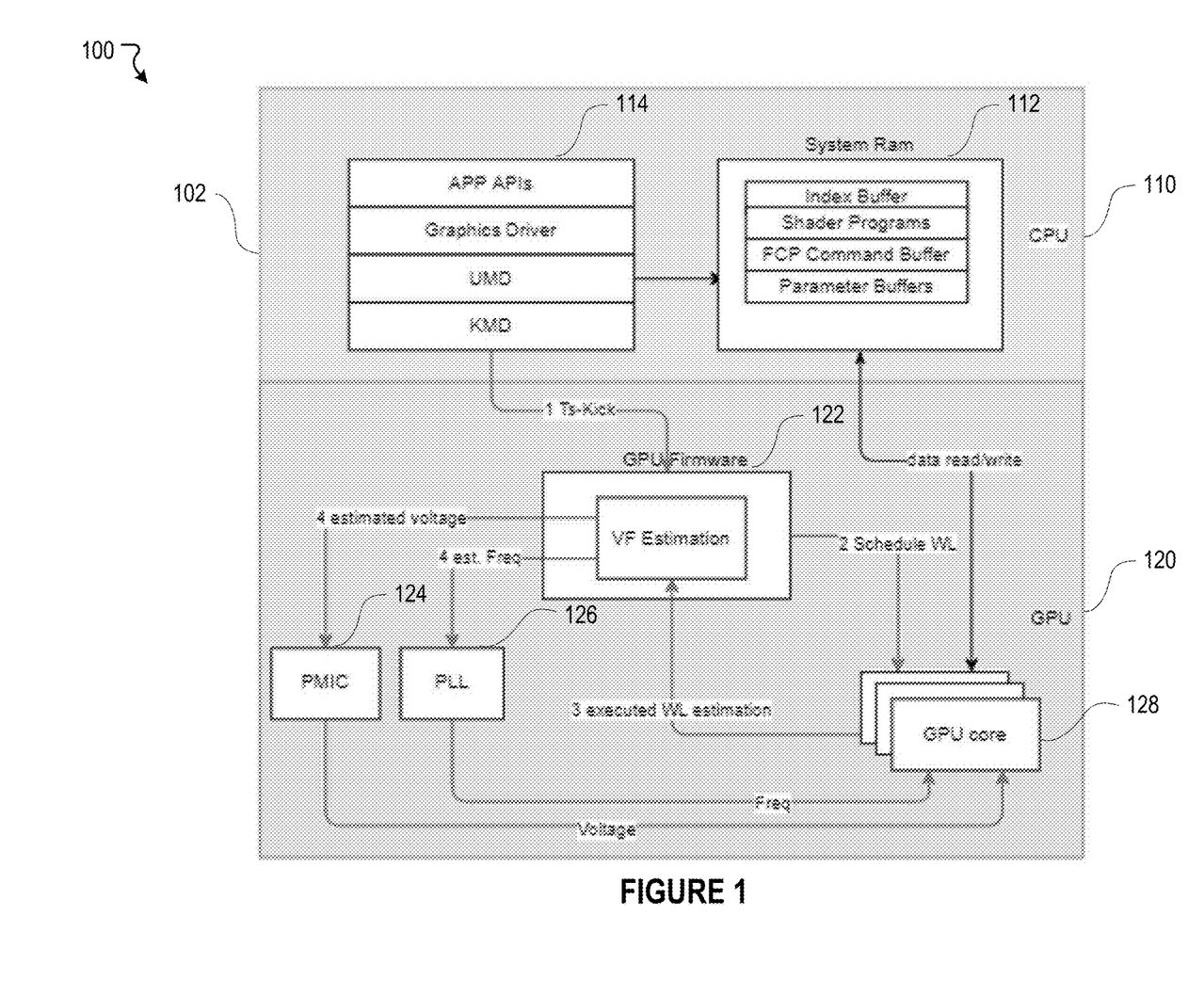
FIG. 1 illustrates a conventional dynamic voltage frequency scaling scheme.

FIG. 1 illustrates a conventional dynamic voltage frequency scaling (DVFS) scheme 100. As shown in FIG. 1, the conventional DVFS scheme 100 can include a computing system 102 configured to render graphics for two-dimensional (2D) or three-dimensional (3D) images or videos. The computing system 102 can include a central processing unit (CPU) 110 coupled to a graphics processing unit (GPU) 120 over a data bus, such as a peripheral component interconnect express (PCIe) bus, for example. The CPU 110 in conjunction with the GPU 120 can be instructed to render graphics on a display associated with the computing system. For example, a computer application or program (e.g., a virtual reality application, an augmented reality application, etc.) running on the computing system 102 can provide instructions to the CPU 110 and/or the GPU 120 to render graphics associated with the computer program through the display.

The CPU 110 and the GPU 120 can have access to a system memory 112. The system memory 112 can store data relating to index buffer, shader programs, GPU frontend command processor (FCP) command buffer, and parameter buffers that are needed in rendering graphics. The CPU 110 and the GPU 120 can write and/or read various data to and from the system memory 112. For example, once the GPU 120 performs a graphics rendering function or executes a graphics rendering command, such as executing a draw function, the GPU 120 can write resulting data to a memory location, such as the shader programs, on the system memory 112. The CPU 110 can then subsequently access this data from the system memory 112 and display this data to a display. In some examples, the CPU 110 can have access to an operating system (OS) driver stack 114. The OS driver stack 114 can include various application programming interfaces, graphics drivers, user-mode graphics drivers (UMDs), and kernel-mode drivers (KMDs). Through the OS driver stack 114, computer applications running on the computing system 102 can access the CPU 110 and the GPU 120 to execute various graphics related commands instructed by the computer applications.

The GPU 120 can include at least one non-volatile memory 122 storing GPU firmware, one power management integrated circuit (PMIC) 124, one phase lock loop (PLL) 126, and a plurality of GPU cores 128. The non-volatile memory 122 can be any suitable memory type. For example, the non-volatile memory 122 can be a programmable read-only memory (PROM) or an electrically erasable programmable read-only memory (EEPROM). The GPU firmware can be configured to provide instructions to the PMIC 124, PLL 126, and the plurality of GPU cores 128 based on commands of a workload (e.g., "Ts-Kick" of FIG. 1) to be executed by the GPU 120. For example, the GPU firmware can receive commands to render graphics. In this example, the GPU firmware can schedule or allocate the commands to one or more GPU cores of the plurality of GPU cores 128 (e.g., "schedule WL" of FIG. 1), and estimate, based on previous workloads (e.g., "executed WL estimation" of FIG. 1), operating voltages and frequencies for the one or more GPU cores to execute the scheduled one or more commands (e.g., "estimated voltage" and "estimated frequency" of FIG. 1). In some examples, the plurality of GPU cores 128 can include power and performance counters. The power and performance counters can be configured to count events such as a number of instructions or commands a GPU core has executed, a number of pixels/vertexes/primitives a GPU core has processed, a number of memory reads/writes a GPU core has performed, etc. In some examples, the power and performance counters can be implemented as registers in hardware, and major hardware function blocks of a GPU core can have multiple counters counting the various events mentioned above. Values stored in the power and performance counts can represent workloads to be processed by a GPU core and are a direct reflection of GPU power/performance. For example, values corresponding to GPU power stored in the power counter can be used to check whether power to the GPU exceeds a threshold, such as a maximum power allowed for the GPU core. In this example, if the power exceeds the threshold, operating voltages and frequencies to the GPU core need to be quickly adjust before potential thermal issue occurs. In some cases, counters can record relevant command execution events while a GPU simulation models developed in high-level and RTL languages simulate various real-world use-cases for those command execution events when rendering graphics. Many variations are possible and contemplated.

In some examples, the GPU firmware can include a particular set of instructions to estimate operating voltages and frequencies for the plurality of GPU cores 128 (e.g., "VF Estimation" of FIG. 1). This particular set of instructions is responsible for estimating the operating voltages and frequencies. For example, machine-compatible codes responsible for estimating operating voltages and frequencies for the plurality of GPU cores 128 can be stored in the GPU firmware for execution. In some examples, the PMIC 124 can be a logic configured to provide operating voltages to the plurality of GPU cores 128 of the GPU 120. In some examples, the PMIC 124 can be a separate chip external to the GPU 120. In other embodiments, the PMIC 124 can be integrated as part of the GPU 120. In some examples, the PLL 126 can be a logic configured to provide operating frequencies to the plurality of GPU cores 128 of the GPU 120. Similar to the PMIC 124, in some examples, the PLL 126 can be a separate chip external to the GPU 120. In other examples, the PLL 126 can be integrated as part of the GPU 120.

The conventional DVFS scheme 100 of FIG. 1 has its disadvantages. For example, it lacks instantaneous effectiveness. Under conventional methods, operating voltages and frequencies provided to a GPU for executing commands of a current workload are determined based on the previous workloads executed by the GPU and power consumed by the GPU during execution of the previous workloads. As such, the conventional DVFS scheme 100 is reactive in nature. Referring back to FIG. 1, steps 1 to 4 show a process of how the GPU firmware determines operating voltage and frequency for the GPU 120 for a upcoming workload according to a previous executed workload. Step 1: The GPU firmware of the GPU 120 receives an instruction ("1 Ts-Kick") from the CPU 110 to execute a workload (i.e., render an image frame). Step 2: The GPU firmware schedules the upcoming workload to one or more GPU cores of the plurality of GPU cores 128. Step 3: Based on the one or more GPU cores selected to perform the upcoming workload, the GPU firmware estimates, based on previous workloads executed by the one or more selected GPU cores, operating voltages and frequencies to be provided to the one or more selected GPU cores. Step 4: The GPU firmware provides the estimated operating voltages and frequencies to the one or more selected GPU cores to execute the upcoming workload. As such, the operating voltages and frequencies provided to the one or more selected GPU cores are reactive to execution of the upcoming workload.

Another disadvantage of the conventional DVFS scheme 100 is gross granularity. Under conventional methods, a workload of a GPU is generally calculated on a per-frame basis, and adjustments to operating voltages and frequencies of the GPU are generally done at a per-frame or multiple-frames basis, which is not fully optimized for GPU performance or power. In particular, in processing a frame of image, hundreds of commands will be executed, and the power requirement for each command might well be different. For example, a draw command is one of the more important commands to be executed by the GPU, particularly for three-dimension graphics rendering. Draw command related data can include, for example, argument counts, constant data sizes, index count per instance, instance count, vertex buffer size, vertex buffer stride, etc. In some cases, the draw command can also have various attributes, such as command deadlines, command workload cycles, command power, command frequency/voltage operation, etc. The draw command will be discussed in further detail with reference to FIG. 3C herein. Since each draw command process different amount of data, the power requirement for different draw commands could be very different. Another important command to be executed by the GPU in three-dimensional graphics renderings is a shader command. Shader command related data can include, for example, vertex shaders, tessellation control and evaluation shaders, geometry shaders, fragment shaders, and compute shaders. The power requirement for the shader command could be very different from that of the draw command. In general, the conventional DVFS scheme 100 is not an optimal solution because the conventional DVFS scheme 100 is based on past workloads, derived operating voltages and frequencies do not represent characteristics of current workloads, so the conventional DVFS scheme 100 does not provide an optimal power saving solution.

Figure 2:
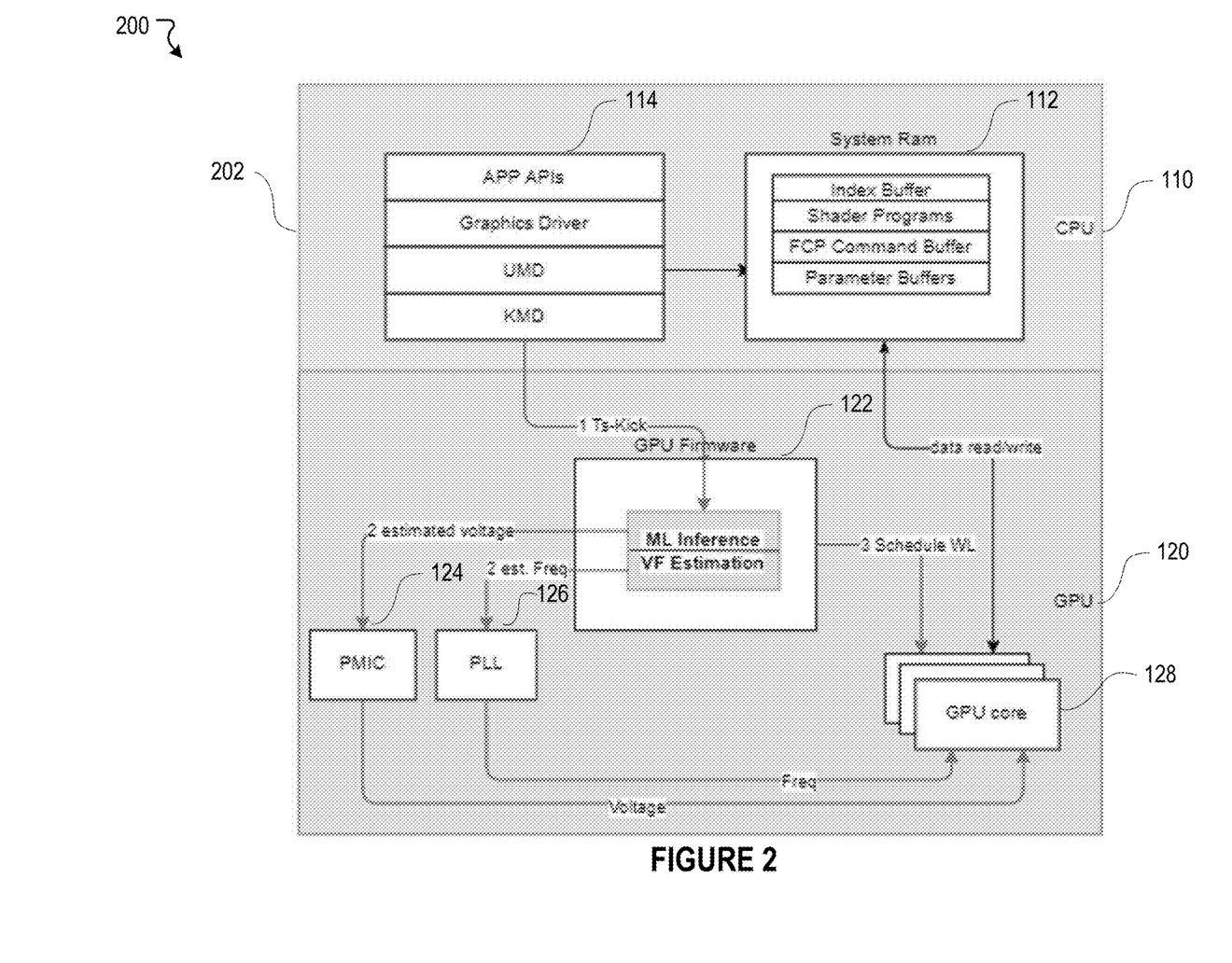
FIG. 2 illustrates an improved dynamic voltage frequency scaling scheme, according to various embodiments of the present disclosure.

FIG. 2 illustrates an improved dynamic voltage frequency scaling (DVFS) scheme 200, according to various embodiments of the present disclosure. Similar to the conventional DVFS scheme 100 of FIG. 1, the improved DVFS scheme 200 can include a computing system 202 configured to render graphics for two-dimensional or three-dimensional images or videos. This computing system 202 includes same components as in the computing system 102 of FIG. 1, therefore, discussions of these components will not be repeated here. Unlike the conventional DVFS scheme 100 of FIG. 1, the improved DVFS 200 can improve instantaneous responsiveness or effectiveness of the conventional DVFS scheme 100, can provide fine-tune adjustment granularity DVFS so that optimal operating voltages and frequencies can be provided to GPU cores on a per-command basis, as opposed to, on a per-frame basis, and can provide a machine learning-based optimal solution for GPU power management.

Figure 3A:
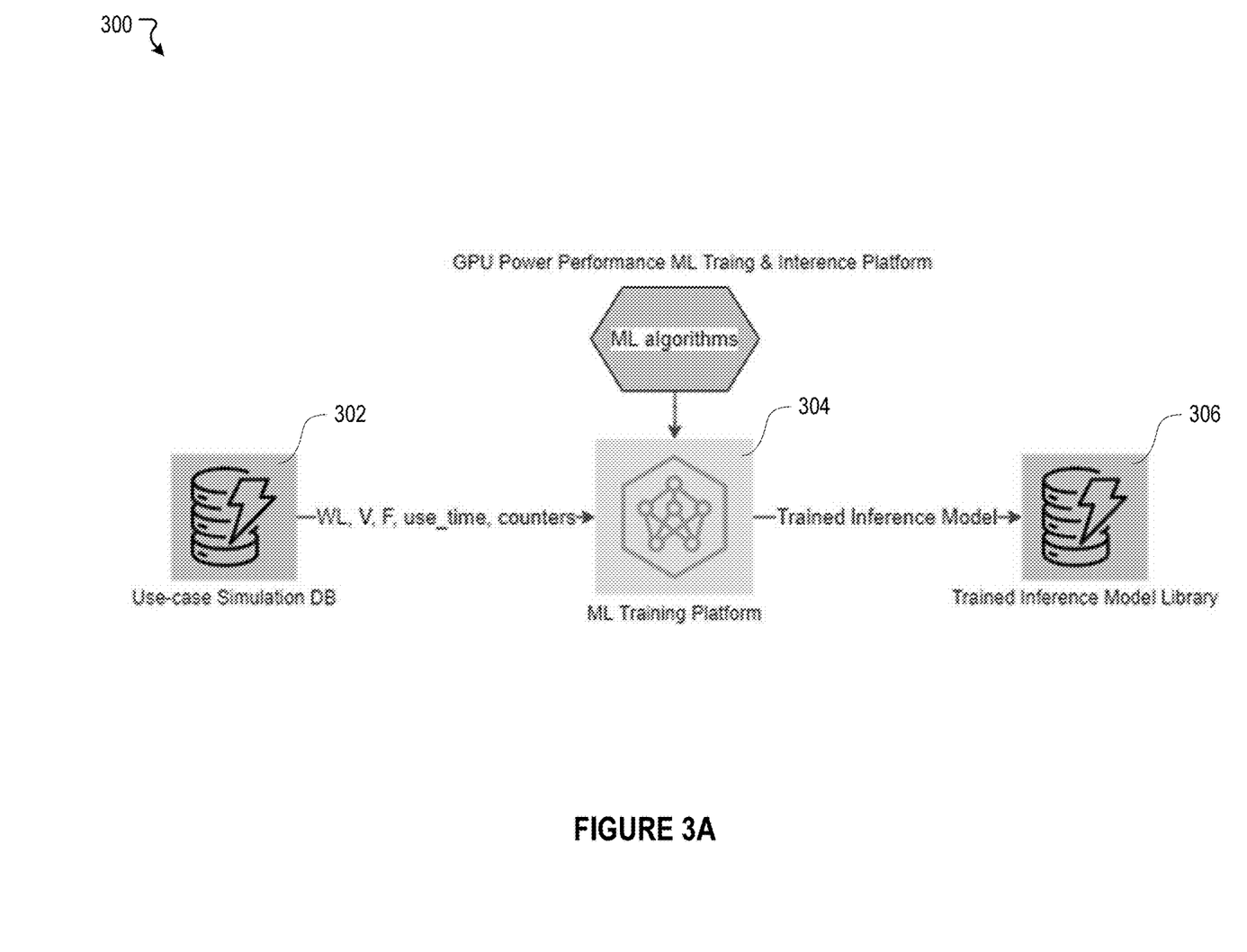
FIG. 3A illustrates a computing environment in which the machine learning model of the GPU firmware under the improved dynamic voltage frequency scaling scheme can be trained, according to various embodiments of the current disclosure.

In some embodiments, the GPU firmware stored in the non-volatile memory 122 of the computing system can include a particular set of instructions (e.g., "ML Interference") that is dedicated for estimating operating voltages and frequencies for the plurality of GPU cores 128. This particular set of instructions, in some embodiments, can be associated with instructions (e.g., codes) to execute a machine learning model to "proactively" estimate the operating voltages and frequencies for the plurality of GPU cores 128 on a per-command basis. The machine learning model can estimate operating voltage and frequency for each of the plurality of GPU cores 128 based on respective commands to be executed by each of the plurality of GPU cores 128. For each command to the executed by a GPU core, the machine learning model can estimate operating voltage and frequency for the GPU core. In this way, the improved DVFS scheme 200 can provide fine adjustments to power optimizations of the plurality of GPU cores 128. In some embodiments, the machine learning model can comprise a plurality of inference models. Once the plurality of inference models are trained, these models can determine optimal voltages and frequencies to provide to GPU cores based on commands to be executed by the GPU cores. The machine learning model and the plurality of inference models will be discussed in further detail in reference to FIG. 3 herein.

As shown in FIG. 2, the improved DVFS scheme 200 eliminates a step being performed by the GPU firmware under the conventional DVFS scheme 100. As discussed, in the conventional DVFS scheme 100, the GPU firmware can estimate operating voltages and frequencies for a current workload based on operating voltages and frequencies of previous workloads. In contrast, in the improved DVFS scheme, the GPU firmware can directly estimate operating voltages and frequencies of the current workload by evaluating commands of the current workload without having to evaluate operating voltages and frequencies of previous workloads. As such, the improved DVFS scheme 200 is quicker to respond to fluctuations in workloads than the conventional DVFS scheme 100. By defining the workload of the GPU on a per command basis, such as per draw basis, the improved DVFS scheme 200 can adjust operating voltages and frequencies of a GPU in fine granularity, which significantly improves its performance as some commands in processing a frame may require a higher frequency and some commands in processing the same frame may require a lower frequency.

In some embodiments, the improved DVFS scheme 200 can adjust operating voltage and frequency provided to a GPU core if a determined power consumption exceeds a threshold (i.e., power limit, thermal limit, etc.) of the CPU core. For example, the improved DVFS scheme 200 determines, based on a command to be executed by a GPU core, optimal operating voltage and frequency for the GPU core to execute the command. In this example, optimal operating voltage and frequency for the GPU core would exceed thermal limit of the GPU core, which causes the GPU core to thermal throttle. In this example, the improved DVFS scheme 200 can adjust the optimal operating voltage and frequency lower so not the exceed the thermal limit.

FIG. 3A illustrates a computing environment 300 in which the machine learning model of the GPU firmware under the improved DVFS scheme 200 can be trained, according to various embodiments of the current disclosure. As shown in FIG. 3A, in some embodiments, the computing environment 300 can include a use-case simulation database 302, a machine learning training platform 304, and a trained inference model library 306. The use-case simulation database 302 can store various simulated data from a GPU simulation model. These various simulated data can include, for example, simulated commands for a workload, simulated operating voltages, simulated operating frequencies, simulated power consumption and simulated performance data of GPU cores in executing the simulated commands. In some embodiments, the use-case simulation database 302 can store power consumption data of GPU cores and its components from real-world use-cases. Leveraging the above data and adopting proper algorithms, predictive and adaptive GPU DVFS inference models can be trained under various use-case workloads. The machine learning training platform 304 can be a software development environment that can be used to train the inference models of the machine learning model. For example, in some embodiments, the machine learning training platform 304 can be an integrated development environment (IDE). The trained inference model library 306 can be a database in which the trained inference models of the machine learning model are stored to later access.

As shown in FIG. 3A, data obtained from 3D graphics rendering under various use cases including commands, command execution times, performance, and power records, etc. can be obtained. Power consumption data for the 3D graphics rendering workloads can also be obtained. These data can then be used as a training dataset to train the inference models. In addition, actual usage data from simulations of the GPU simulation model can be stored in the use-case simulation database 302, and used to train the inference models. In some embodiments, Data stored in the use-case simulation database 302 can be generated by running game applications on C-language GPU model, and usage data including commands and events under various operating voltages/frequencies, which all can be fed into the algorithm to train the interference models.

In some embodiments, the machine learning model can be associated with at least three inference models: a draw performance inference model, a power inference model, and a voltage-frequency inference model. The draw performance inference model can be trained according to simulated or real-world commands of a workload, and corresponding voltages/frequencies provided to GPU cores and execution times of the GPU cores in executing the simulated or real-world commands of the workload. The power inference model can be trained according to simulated or real-world commands of a workload, and corresponding voltages/frequencies to the GPU cores and power/performance data of the GPU cores in executing the simulated or real-world commands of the workload. The power inference model can be used to determine power requirements of various graphics commands including a draw command, and ensures whether power provided to the GPU cores exceed the maximum power allowed in a computing system. If so, operating voltages and frequencies need to be quickly adjust before thermal issue occurs. The voltage-frequency inference model can be trained according to simulated or real-world commands of a workload and performance of GPU cores in executing the simulated or real-world commands of the workload. The draw performance inference model, the power inference model, and the voltage-frequency inference model will be discussed in further detail with reference to FIG. 3B herein.

Figure 3B:
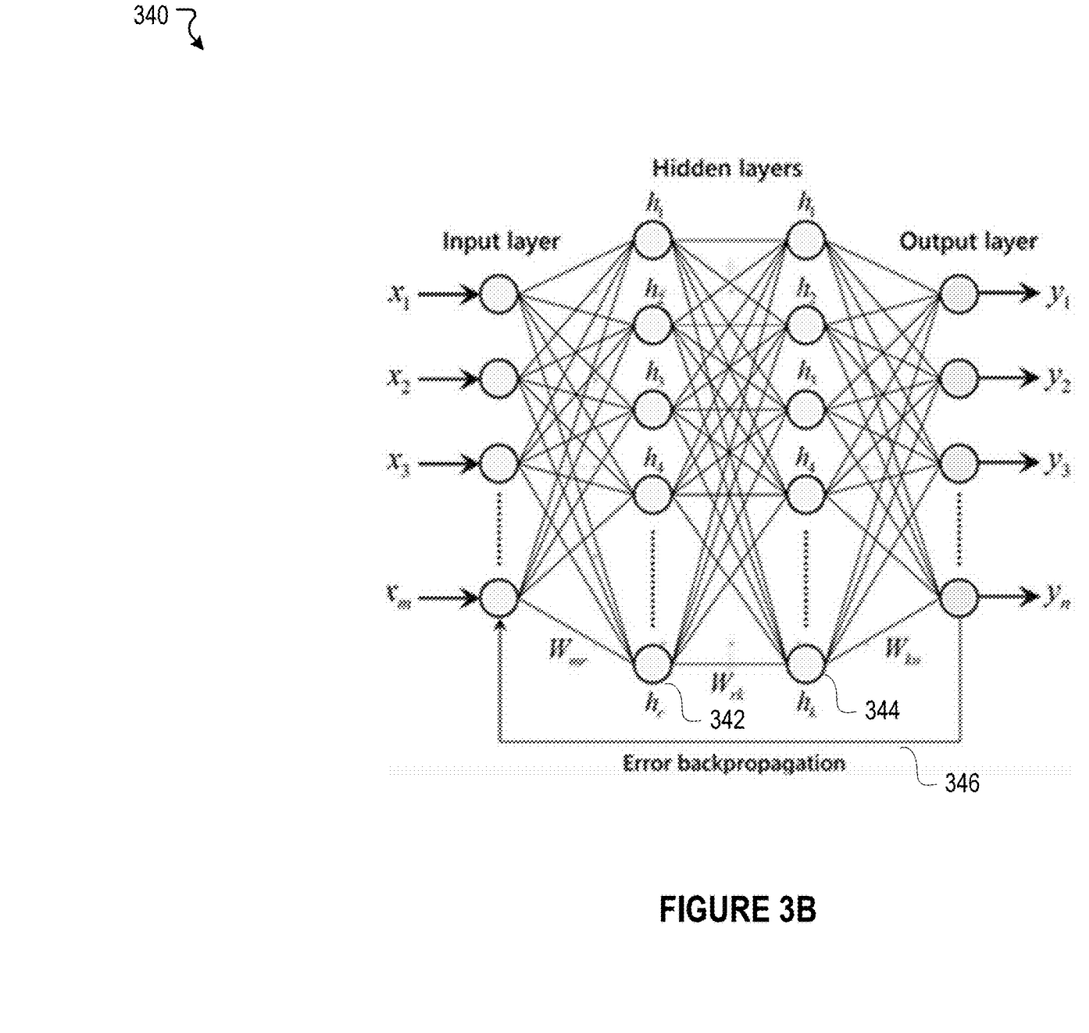
FIG. 3B illustrates an example neural network from which the draw performance inference model, the power inference model, and the voltage-frequency inference model can be implemented, according to various embodiments of the current disclosure.

FIG. 3B illustrates an example neural network 340 from which the draw performance inference model, the power inference model, and the voltage-frequency inference model can be implemented, according to various embodiments of the current disclosure. In various embodiments, each of the draw performance inference model, the power inference model, and the voltage-frequency inference model can be implemented as the neural network 340. In general the neural network 340 can be implemented using any suitable neural network. In a particular embodiment, the neural network 340 can be a regression artificial neural network or a convolutional neural network. In the regression artificial neural network, a number of hidden layers and activation functions of the hidden layers can be adjusted during training to optimize performance of the inference models. For example, the neural network 340 is shown to include two hidden layers 342, 344. In this example, during training of the neural network 340 for the voltage-frequency inference model, the two hidden layers 342, 344 may not be sufficient to accurately determine optimal operating voltages and frequencies for GPU cores. As such, in this example, additional hidden layers may be added to the neural network 340 to improve performance. In some embodiments, the neural network 340 can include an error backpropagation 346. The error backpropagation 346 can help to optimize the example neural network 340 during training.

In some embodiments, the voltage-frequency inference model based on the example neural network 340 can be trained using draw command data, command deadline, and command workload cycles as inputs (e.g., $x_1, x_2, \ldots x_m$, of FIG. 3B). In some embodiments, the power inference based on the example neural network 340 can be trained using draw command data and operating voltages and frequencies associated with commands as inputs.

As discussed above, by integrating the trained inference models within the current reactive DVFS scheme, a predictive DVFS scheme to adjust GPU core voltage and frequency can be implemented. The predictive DVFS scheme has already been discussed with reference to FIG. 2 above. Referring back to FIG. 2, notice that GPU incorporating the inference models can determine and make operating voltage and frequency adjustment requests according to a current workload before the current workload is scheduled to execute in advance. In this way, the predictive DVFS ensures that the current workload can be executed under optimal operating condition, thereby enhancing performance/watt metrics. This is because the inference models are trained to determine optimal voltages and frequencies to provide to GPU cores based on commands to be executed during the current workload and before these commands are executed. As such, the invention is "predictive" in nature.

Figure 3C:
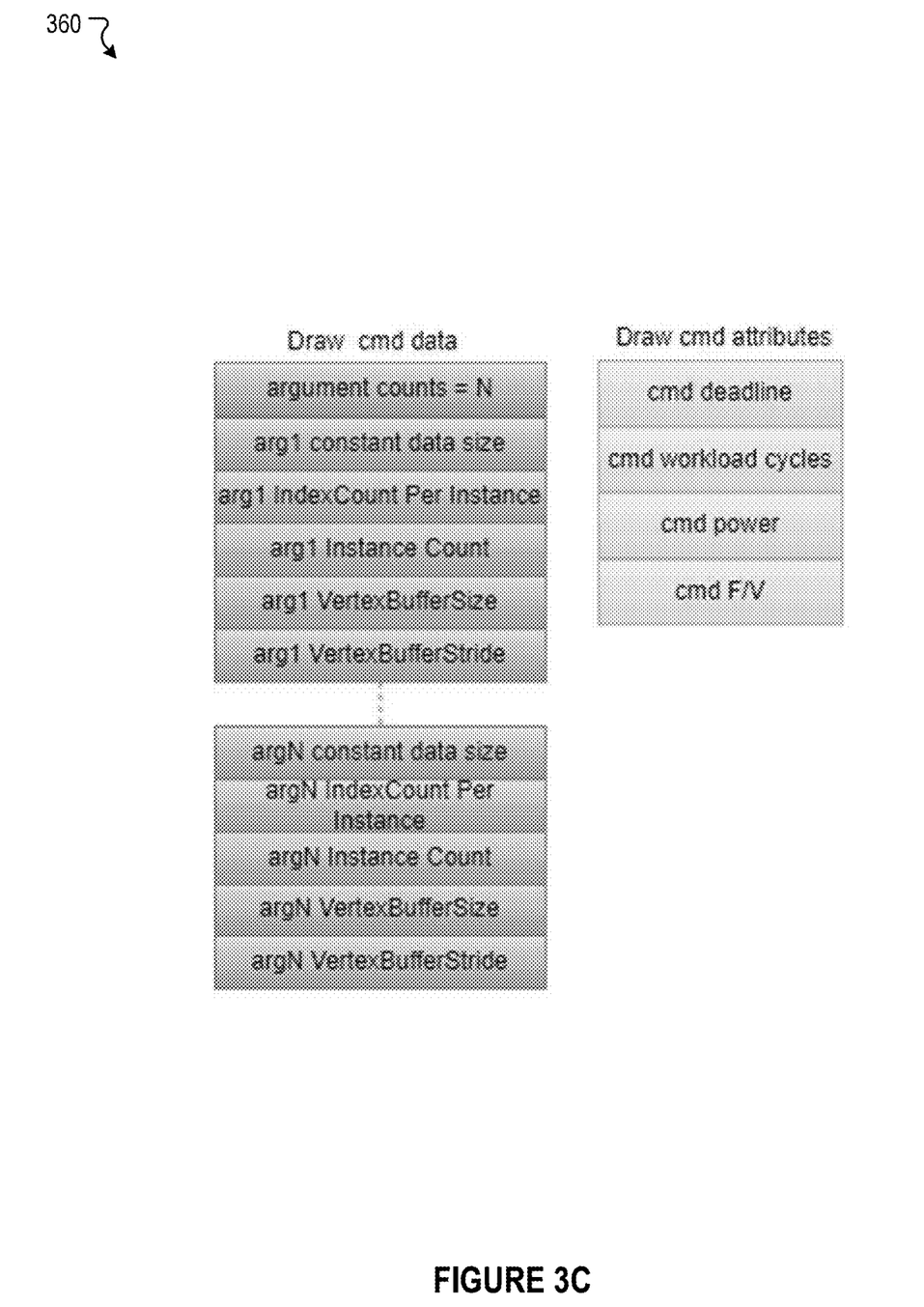
FIG. 3C illustrates an example draw command used in rendering image frames, according to various embodiments of the present disclosure.

FIG. 3C illustrates an example draw command 360 used in rendering image frames, according to various embodiments of the present disclosure. As discussed with reference to FIG. 1 above, the draw command 360 is one of the more important commands to be executed by a GPU, particularly for three-dimension graphics rendering. As shown in FIG. 3C, the draw command 360 can be associated with various arguments in executing the draw command 360. These arguments can include, for example, argument counts, argument constant data size, argument index count per instance, argument instance count, argument vertex buffer size, argument vertex buffer stride, etc. In some cases, the draw command 360 can be associated with various command attributes. These command attributes can include, for example, command deadline, command workload cycles, command power, and command frequency and voltage. In some embodiments, arguments and command attributes of various graphics rendering commands, including the draw command 360, can stored in counters of GPU cores.

Figure 4:
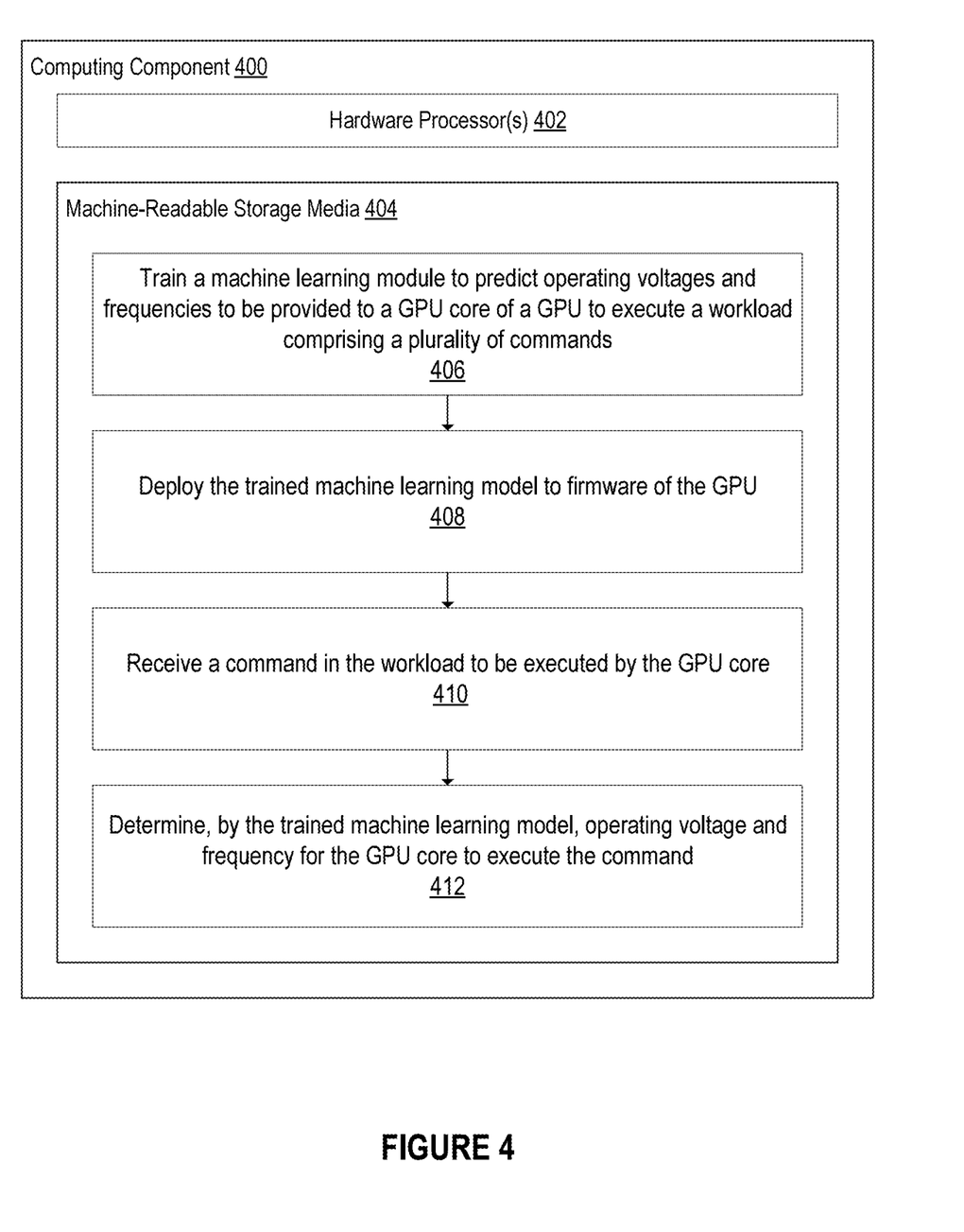
FIG. 4 illustrates a computing component that includes one or more hardware processors and a machine-readable storage media storing a set of machine-readable/machine-executable instructions that, when executed, cause the hardware processor(s) to perform a method to dynamically adjust operating conditions of a graphics processing unit (GPU), according to various embodiments of the present disclosure.

FIG. 4 illustrates a computing component 400 that includes one or more hardware processors 402 and a machine-readable storage media 404 storing a set of machine-readable/machine-executable instructions that, when executed, cause the hardware processor(s) 402 to perform a method to dynamically adjust operating conditions of a graphics processing unit (GPU), according to various embodiments of the present disclosure.

At block 406, a machine learning model can be trained to determine operating voltages and frequencies to be provided to a GPU core of the GPU to execute a workload comprising a plurality of commands. In some embodiments, the machine learning model can comprise a voltage-frequency inference model trained to determine operating voltages and frequencies of the GPU core in executing commands. In some embodiments, the machine learning model can further comprise a draw performance inference model trained to determine performance data of the GPU core in executing the commands. In some embodiments, the machine learning model can further comprise a power inference model trained to determine power consumptions of the GPU core in executing the commands. In some embodiments, the machine learning model can be trained with a first dataset generated from a GPU simulation model. The first dataset can comprise data associated with simulated commands for a workload, simulated operating voltages, simulated operating frequencies, simulated power consumption and simulated performance data of the GPU core in executing the simulated commands. In some embodiments, the machine learning model can be trained with a second dataset generated from a GPU simulation model. The second dataset can comprise data associated with simulated commands for a workload, simulated operating voltages, simulated operating frequencies, simulated power consumption and simulated performance data of the GPU core in executing the simulated commands. In some embodiments, the commands of the workload can include at least a draw command for rendering three-dimensional graphics.

At block 408, the trained machine learning model can be deployed to firmware of the GPU.

At block 410, a command in the workload to be executed by the GPU core can be received.

At block 412, the trained machine learning model can determine operating voltage and frequency for the GPU core to execute the command. In some embodiments, performance data of the GPU core in executing the command can be determined based on the command. In some embodiments, a power consumption of the GPU core in executing the command can be determined based on the command. In some embodiments, the optimal operating voltage and frequency for the GPU core to execute the command can be determined based on the command, the determined performance data, and the determined power consumption. In some embodiments, the optimal operating voltage and frequency for the GPU core to execute the command can be determined directly based on the command.

In general, the inventions disclosed herein can be implemented using any suitable computing systems. For example, in some embodiments, various inference models disclosed herein can be loaded onto a non-volatile memory, such as a PROM or an EEPROM, associated with or accessible by a GPU on a graphics card. In some embodiments, the inference models disclosed herein can implemented on a separate a computing system or computing device controlling a GPU. For example, in cases where a mobile computing device is coupled to an external GPU device (eGPU). In such embodiments, the inference models can be stored in the computing sytem. In varouis embodiments, the computer system can include a main memory, such as a random access memory (RAM), cache and/or other dynamic storage devices, coupled to a bus for storing information and instructions to be executed by a processor. For example, instructions associated with the inference models. The main memory also may be used for storing temporary variables or other intermediate information during execution of instructions by the processor. Such instructions, when stored in a storage media accessible to the processor, render the computer system into a special-purpose machine that is customized to perform the operations specified in the instructions. For example, a computer program or application running on the computer system may control operating voltages and frequencies for an eGPU when rendering graphics.

In some embodiments, the computer system can further include a read only memory (ROM) or other static storage device coupled to the bus for storing static information and instructions for the processor. A storage device, such as a magnetic disk, optical disk, or USB thumb drive (Flash drive), etc., can be provided and coupled to the bus for storing information and instructions.

In some embodiments, the computer system may be coupled via the bus to output device(s), such as a cathode ray tube (CRT) or LCD display (or touch screen), for displaying information to a user. Input device(s), including alphanumeric and other keys, can be coupled to the bus for communicating information and command selections to the processor. Another type of user input device can be a cursor control device, such as a computer mouse or other equivalent input devices. The computer system can also include a communication interface, such as a network interface card, coupled to the bus.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as another component, and/or comprising same or similar features, characteristics, and parameters as another component.

What we claim is:

1. A computer-implemented method to dynamically adjust operating conditions of a graphics processing unit (GPU), the method comprising:
   training a machine learning model to determine operating voltages and frequencies to be provided to a GPU core of the GPU to execute a workload comprising a plurality of commands;
   deploying the trained machine learning model to firmware of the GPU;
   receiving a command in the workload to be executed by the GPU core; and
   determining, by the trained machine learning model and based on the command, operating voltage and frequency for the GPU core to execute the command.

2. The computer-implemented method of claim 1, further comprising:
   providing the determined operating voltage and frequency to the GPU core before the GPU core executes the command.

3. The computer-implemented method of claim 1, wherein the machine learning model comprises a voltage-frequency inference model trained to determine operating voltages and frequencies of the GPU core in executing commands.

4. The computer-implemented method of claim 3, wherein the machine learning model further comprises a draw performance inference model trained to determine performance data of the GPU core in executing the commands.

5. The computer-implemented method of claim 4, wherein the machine learning model further comprises a power inference model trained to determine power consumptions of the GPU core in executing the commands.

6. The computer-implemented method of claim 5, further comprising:
   adjusting the operating voltage and frequency for the GPU core if a determined power consumption exceeds a threshold.

7. The computer-implemented method of claim 5, wherein determining the operating voltage and frequency for the GPU core to execute the command comprises:
   determining, based on the command, performance data of the GPU core in executing the command;
   determining, based on the command, a power consumption of the GPU core in executing the command; and
   generating, based on the command, the determined performance data, and the determined power consumption, an optimal operating voltage and frequency for the GPU core to execute the command.

8. The computer-implemented method of claim 1, further comprising:
   training the machine learning model with a first dataset generated from a GPU simulation model, wherein the first dataset comprises data associated with simulated commands for a workload, simulated operating voltages, simulated operating frequencies, simulated power consumption and simulated performance data of the GPU core in executing the simulated commands.

9. The computer-implemented method of claim 8, further comprising:
   training the machine learning model with a second dataset generated from the GPU simulation model, wherein the second dataset comprises data associated with simulated commands for a workload, simulated operating voltages, simulated operating frequencies, simulated power consumption and simulated performance data of the GPU core in executing the simulated commands.

10. The computer-implemented method of claim 1, further comprising:
    receiving a second command to be executed by the GPU core; and
    determining, by the trained machine learning model, based on the second command, second operating voltage and frequency for the GPU core to execute the second command.

11. The computer-implemented method of claim 1, wherein the commands of the workload include at least a draw command for rendering three-dimensional graphics.

12. The computer-implemented method of claim 1, wherein the trained machine learning model is not based on a feedback mechanism in which the trained machine learning model provides operating frequency and voltage to the GPU core to execute a current workload based on operating frequency and voltage of the GPU core in executing a previous workload.

13. A non-volatile memory of a computing system storing instructions that, when executed, cause the computing system to perform a method of dynamically adjusting operating conditions of a graphics processing unit (GPU), the method comprising:
    receiving a command in a workload to be executed by a GPU core of the GPU; and
    determining, by a machine learning model and based on the command, operating voltage and frequency for the GPU core to execute the command.

14. The non-volatile memory of claim 13, wherein the method further comprising:
    providing the determined operating voltage and frequency to the GPU core before the GPU core executes the command.

15. The non-volatile memory of claim 13, wherein the machine learning model comprises a voltage-frequency inference model trained to determine operating voltages and frequencies of the GPU core in executing commands.

16. The non-volatile memory of claim 15, wherein the machine learning model further comprises a draw performance inference model trained to determine performance data of the GPU core in executing the commands.

17. The non-volatile memory of claim 16, wherein the machine learning model further comprises a power inference model trained to determine power consumptions of the GPU core in executing the commands.

18. The non-volatile memory of claim 17, wherein the instructions, when executed, caused the computing system to further perform:
   adjusting the operating voltage and frequency for the GPU core if the determined power consumption exceeds a threshold.

19. The non-volatile memory of claim 17, wherein determining the operating voltage and frequency for the GPU core to execute the command comprises:
   determining, based on the command, performance data of the GPU core in executing the command;
   determining, based on the command, a power consumption of the GPU core in executing the command; and
   generating, based on the command, the determined performance data, and the determined power consumption, an optimal operating voltage and frequency for the GPU core to execute the command.

20. The non-volatile memory of claim 13, wherein commands of the workload include at least a draw command for rendering three-dimensional graphics.

* * * * *